United States Patent
Chang et al.

(10) Patent No.: US 9,274,217 B2
(45) Date of Patent: Mar. 1, 2016

(54) MICROWAVE SENSOR HAVING FUNCTION OF RANGE GATES

(71) Applicant: U&U ENGINEERING INC, Taipei (TW)

(72) Inventors: Chi-Ho Chang, Taipei (TW); Yun-Chun Sung, Taipei (TW); Ming-Tsung Hsu, Taipei (TW); Jen-Chih Huang, Taipei (TW); Guo-Chih Lu, Taipei (TW); Ping-Chang Tsao, Taipei (TW); Li-Yu Su, Taipei (TW)

(73) Assignee: U&U ENGINEERING INC., Taipei (TW)

( * ) Notice: Subject to any disclaimer, the term of this patent is extended or adjusted under 35 U.S.C. 154(b) by 353 days.

(21) Appl. No.: 14/095,660

(22) Filed: Dec. 3, 2013

(65) Prior Publication Data

US 2015/0061918 A1 Mar. 5, 2015

(30) Foreign Application Priority Data

Aug. 28, 2013 (TW) .............................. 102130947 A (51) Int. Cl.
*G01S 13/18* (2006.01)
*G01S 13/58* (2006.01)
*G01S 7/03* (2006.01)
*G01S 7/35* (2006.01)
*G01S 13/34* (2006.01)

(52) U.S. Cl.
CPC .............. *G01S 13/584* (2013.01); *G01S 7/032* (2013.01); *G01S 7/35* (2013.01); *G01S 13/345* (2013.01)

(58) Field of Classification Search
CPC ....... G01S 13/18; G01S 13/64; G01S 13/584; G01S 7/032; G01S 7/35

USPC .................. 342/110, 118, 136, 128–133, 200
See application file for complete search history.

(56) References Cited

U.S. PATENT DOCUMENTS

| 3,641,573 | A | * | 2/1972 | Albanese | G01S 13/325 342/127 |
| 3,932,871 | A | * | 1/1976 | Foote | G01S 13/64 340/552 |
| 4,079,377 | A | * | 3/1978 | zur Heiden | G01S 13/343 342/109 |
| 4,292,635 | A | * | 9/1981 | Rittenbach | G01S 13/53 342/194 |

(Continued)

FOREIGN PATENT DOCUMENTS

| CN | 1206544 C | 6/2005 |
| TW | 259921 | 10/1995 |
| TW | I300851 | 9/2008 |

*Primary Examiner* — John B Sotomayor
*Assistant Examiner* — Marcus Windrich
(74) *Attorney, Agent, or Firm* — Hauptman Ham, LLP (57) ABSTRACT

A microwave sensor is disclosed. The microwave sensor includes an active antenna module, a first low pass filter, a second demodulator, a modulation module, and a discrimination control module. The active antenna module is utilized for transmitting a first FMCW signal towards a target and receiving a second FMCW signal reflected back from the target according to a sweep period. The active antenna module includes a loop antenna and a radio frequency transistor. The first low pass filter and the radio frequency transistor form a first demodulator. The first demodulator and the second demodulator perform two-stage down converting and demodulating to extract information for calculating range and velocity, respectively. The present invention adjusts a radio frequency bandwidth of the FMCW signal by first adjusting an amplitude of a modulation signal generated by the modulation module to control various detection ranges.

11 Claims, 10 Drawing Sheets

(56) References Cited

U.S. PATENT DOCUMENTS

| | | | | |
|---|---|---|---|---|
| 5,361,072 A | * | 11/1994 | Barrick | G01S 7/35 342/133 |
| 5,774,091 A | * | 6/1998 | McEwan | G01C 3/08 342/126 |
| 5,914,683 A | * | 6/1999 | O'Conner | G01S 7/352 342/103 |
| 6,593,874 B2 | * | 7/2003 | Yamashita | G01S 7/354 342/118 |
| 2008/0069286 A1 | * | 3/2008 | Staszewski | G06F 1/04 375/376 |
| 2010/0214157 A1 | * | 8/2010 | McEwan | G01S 13/18 342/173 |
| 2013/0080495 A1 | * | 3/2013 | Staszewski | G06F 9/30032 708/670 |

* cited by examiner

MICROWAVE SENSOR HAVING FUNCTION OF RANGE GATES

CROSS REFERENCE TO RELATED APPLICATION

This application claims priority to Taiwan Application Serial Number 102130947, filed on Aug. 28, 2013, which are herein incorporated by reference.

BACKGROUND OF THE INVENTION

1. Field of the Invention

The present invention relates to a microwave sensor, more particularly, to a microwave sensor utilized for detecting a range and a velocity.

2. Description of the Related Art

Figure 1:
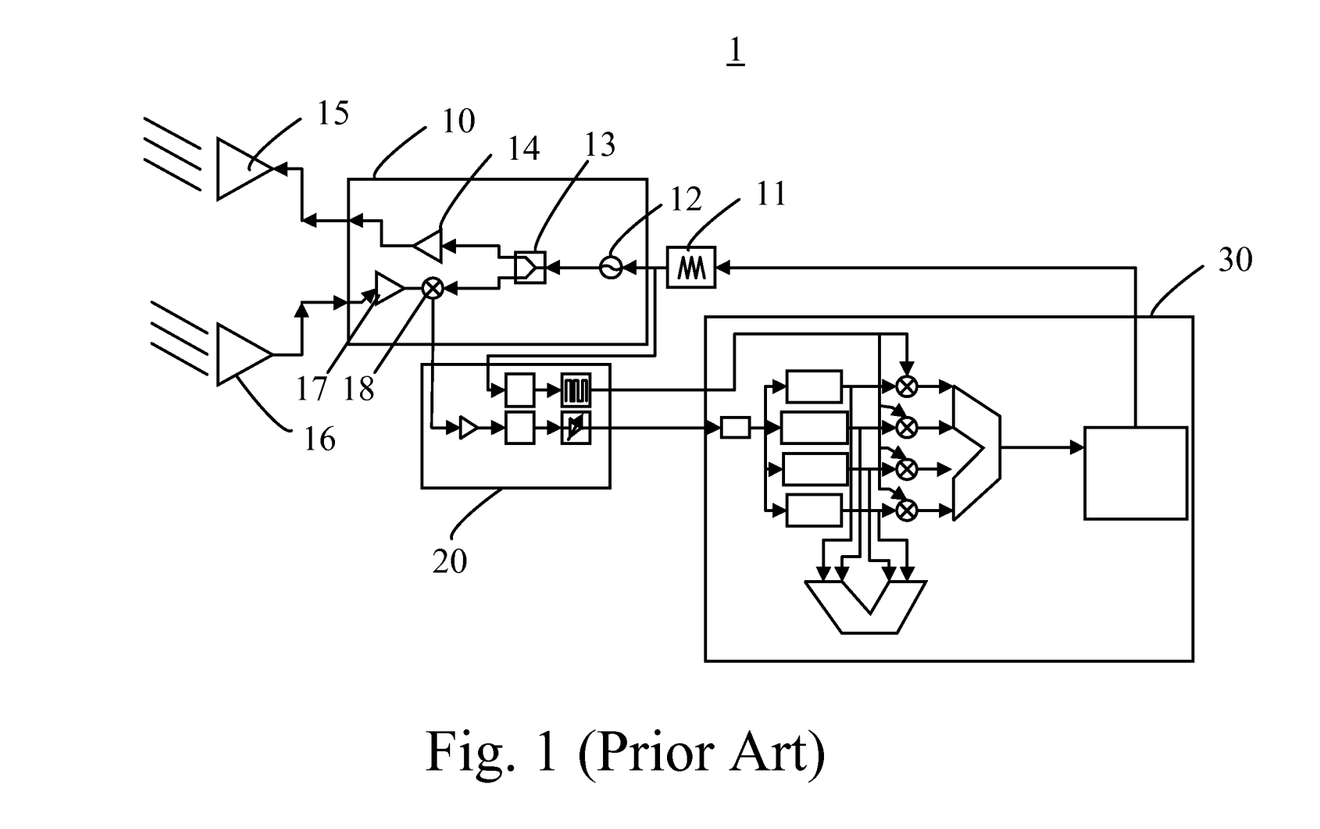
FIG. 1 is a schematic diagram showing a structure of a microwave sensor according to the prior art.

Please refer to FIG. 1, FIG. 1 is a schematic diagram showing a structure of a microwave sensor according to the prior art. The microwave sensor 1 comprises a radio frequency module 10, a demodulation circuit 11, an intermediate module 20, a digital signal processor 30, a transmitting antenna 15 and a receiving antenna 16. The radio frequency module 10 comprises a voltage controlled oscillator 12, a power divider 13, a driving amplifier 14, a low noise amplifier 17, and a mixer 18. The demodulation circuit 11 is used for generating the required demodulation signal, and outputting the demodulation signal to the voltage controlled oscillator 12. The voltage controlled oscillator 12 is an electronic oscillating circuit which controls the oscillation frequency in accordance with the input voltage and finally outputs the frequency modulated continuous wave. The transmitting antenna 15 then emits a transmitted wave. However, before the frequency modulated continuous wave passing the emitting antenna 15, the power divider 13 will input a portion of the power output from the voltage controlled oscillator 12 to the mixer 18 so that an intermediate frequency signal is obtained afterwards. The driving amplifier 14 will amplify the frequency modulated continuous wave before the transmitting antenna 15 receives the frequency modulated continuous wave.

The receiving antenna 16 will input the received signal to the mixer 18 after receiving the echo frequency modulated continuous wave. Before the signal is transmitted to the mixer 18, the low noise amplifier 17 will not only amplify the signal but also inhibit noise as possible to allow subsequent electronic components to perform signal processing. The mixer 18 then calculates the frequency difference between the transmitted wave and the echo wave, down converts the frequency difference and outputs the intermediate frequency signal. After that, the back-end intermediate frequency module 20 regulates the range of detection to obtain the information of the target. Finally, the analog signal is converted to the digital signal and sent to the digital signal processor 30. The digital signal processor 30 thus performs Fourier transforms so as to calculate the target range. If the relative velocity is to be measured, mostly the velocity is derived from the time required for the target to pass or calculated from the frequency difference between frequencies of the transmitting and received beat signals.

However, the emitting antenna 15, the receiving antenna 16, and the radio frequency module 10 in the microwave sensor 1 are first independently designed then integrated together. But the microwave sensor 1 performs detecting based on standard radar principle. In other words, the power level is a major reference for the detection range. At the same time, the size of the antenna directly correlates with the operating frequency. When the operating frequency is lower, the antenna size is larger but the 3 dB beamwidth is larger to result in a wide detection range. Conversely, when the operating frequency is higher, the antenna size is smaller but the 3 dB beamwidth is smaller to result in a narrow detection range. Because the adoption of dual antenna would increase the volume, it is very inappropriate to utilize the dual-antenna architecture in the typically miniaturized sensors. But if the carrier frequency is increased, the 3 dB beamwidth of the antenna becomes smaller, which is inappropriate for the detection of moving targets in a wide-angle environment. In addition, the digital signal processor 30 must perform a large number of Fourier transforms to calculate target range and then the calculation of velocity. Hence, the design of the digital signal processor 30 is more complex and does not fulfill the requirements of the low-cost, small-sized (diameter is smaller than 2 cm), and low power consumption (power consumption is less than 1.5 W) products. Moreover, it must be considered how to measure the velocity under the circumstances of range gates (three-stage range gates).

It is therefore very important to design a new microwave sensor. Not only are the antenna and the ratio frequency module integrated but also the design complexity of the digital signal processor is reduced to satisfy the demand for miniaturization.

SUMMARY OF THE INVENTION

The present invention provides a low power microwave sensor. The microwave sensor comprises an active antenna module, a first low pass filter, a second demodulator, a modulation module, and a discrimination control module. The active antenna module is utilized for transmitting a first frequency modulation continuous wave signal towards a target and receiving a second frequency modulation continuous wave signal reflected back from the target according to a sweep period. The active antenna module comprises a loop antenna and a radio frequency transistor. The loop antenna comprises a transmitting terminal and a receiving terminal. The transmitting terminal is utilized for transmitting the first frequency modulation continuous wave signal, and the receiving terminal is utilized for transmitting the second frequency modulation continuous wave signal. The radio frequency transistor comprises a control port, a first port, and a second port. The second port is coupled to the transmitting terminal, the control port is coupled to the receiving port, and the control port and the second port are out of phase. The first low pass filter is electrically connected to the first port of the radio frequency transistor. The first low pass filter and the radio frequency transistor form a first demodulator. The first demodulator is utilized for demodulating a beat signal based on a range gate, and the beat signal has a frequency equal to a difference between frequencies of the first frequency modulation continuous wave signal and the second frequency modulation continuous wave signal. The second demodulator is utilized for demodulating the beat signal to generate a Doppler signal. A frequency of the Doppler signal is equal to a difference between an up-sweep beat frequency and a down-sweep beat frequency. The modulation module is utilized for generating a modulation signal to the active antenna module based on a range gate selected from a plurality of range gates. A bandwidth of the first frequency modulation continuous wave signal is adjusted according to an amplitude of the modulation signal, and each of the plurality of range gates is corresponding to one of the bandwidths of the first frequency modulation continuous wave signal. The discrimination control module is utilized for bypassing a calculation for the target if the target is located outside the range gate, and calculating a range between the microwave sensor and the target based on the beat signal and a moving velocity of the target based on the frequency of the Doppler signal if the target is located inside the range gate.

According to one embodiment of the present invention, the radio frequency transistor is a bipolar junction transistor, the control port is a base electrode, the first port is an emitting electrode, and the second port is a collector electrode.

According to one embodiment of the present invention, the radio frequency transistor is a field effect transistor, the field effect transistor comprises a pseudo high electron mobility transistor, the control port is a gate electrode, the first port is a source electrode, and the second port is a drain electrode.

According to one embodiment of the present invention, the microwave sensor further comprises a first capacitor, two ends of the first capacitor are connected to the first port and the second port of the radio frequency transistor, and the loop antenna comprises: a first inductor coupled to the second port of the radio frequency transistor; a second inductor; a third inductor coupled to the control port of the radio frequency transistor; a second capacitor coupled between the first inductor and the second inductor; and a third capacitor coupled between the second indictor and the third inductor.

According to one embodiment of the present invention, the modulation module comprises a digital to analog interface of a digital signal processor; the modulation signal is synthesized with the digital to analog interface.

According to one embodiment of the present invention, the modulation module comprises an adder using an operational amplifier, the operational amplifier comprises a plurality of input terminals and an output terminal, each of a plurality or resistors is coupled between the corresponding input terminal and a positive input terminal of the operational amplifier, when one of the input terminals is grounded and the other input terminals are floated, the modulation signal having varied amplitude is output.

According to one embodiment of the present invention, the discrimination control module comprises a range calculation unit electrically connected to the first port of the radio frequency transistor, the range calculation unit is utilized for calculating the range between the microwave sensor and the target based on a first equation, the first equation is $R=(f_b \times c \times T)/(2 \times B)$, where R is the range between the microwave sensor and the target, $f_b$ is a frequency of the beat signal, B is a sweep bandwidth, c is the light velocity, T is the sweep period.

According to one embodiment of the present invention, an angle is formed between the transmitting direction of the first frequency modulation continuous wave signal transmitted from the active antenna module and a moving direction of the target, a velocity calculation unit is utilized for calculating the velocity of the target along a moving direction based on the angle, the light velocity, and a center frequency of carrier of the first frequency modulation continuous wave signal.

According to one embodiment of the present invention, the discrimination control module comprises the velocity calculation unit, the velocity calculation unit is utilized for calculating the velocity of the target along the moving direction based a second equation, the second equation is $v=(f_b^- - f_b^+) \times c/(2 \times f_c \times \cos\theta)$, where v is the velocity of the target along the moving direction, $f_b^-$ is a down-sweep beat frequency, $f_b^+$ is an up-sweep beat frequency, c is the light velocity, $f_c$ is the center frequency of the carrier.

According to one embodiment of the present invention, the second demodulator comprises: an AM peak envelop detector electrically connected to the first low pass filter; and a second low pass filter electrically connected to the AM peak envelop detector, the second low pass filter being utilized for outputting the Doppler signal.

According to one embodiment of the present invention, the first demodulator has a function of the range gates to regulate detection ranges for the target.

In contrast to the prior art, the present invention microwave sensor is suitable for being applied to the miniaturized sensors which are used for detecting the moving targets at a short range but having a wide coverage angle. Since the oscillator and the mixer of the radio frequency module and the antenna are integrated together, the radio frequency transceiver is simplified and shrunken. At the same time, the voltage controlled oscillator and the mixed are replaced by a BJT or a FET (for example: P-Hemt). Not only the size but also the power consumption is improved obviously. Furthermore, the demodulator of the present invention microwave sensor utilizes the diode in cooperation with the low pass filter to replace the mixer and performs the two-stage down converting and demodulating. Because the present invention microwave sensor directly and rapidly extracts the information for range and velocity from the hardware circuit and calculates the range and velocity, the complexity for designing digital signal processor in the traditional microwave sensor in greatly reduced. In addition, the present invention adjusts the radio frequency bandwidth of the FMCW signal by first adjusting the amplitude of the modulation signal generated by the modulation signal generator to control the various detection ranges. In the present invention, a plurality of detection ranges is set. Only the target within the preset detection range is allowed to be induced. The present invention sets each of the detection ranges expressly.

These and other features, aspects and advantages of the present disclosure will become understood with reference to the following description, appended claims and accompanying figures.

DESCRIPTION OF THE EMBODIMENTS

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures.

Figure 2:
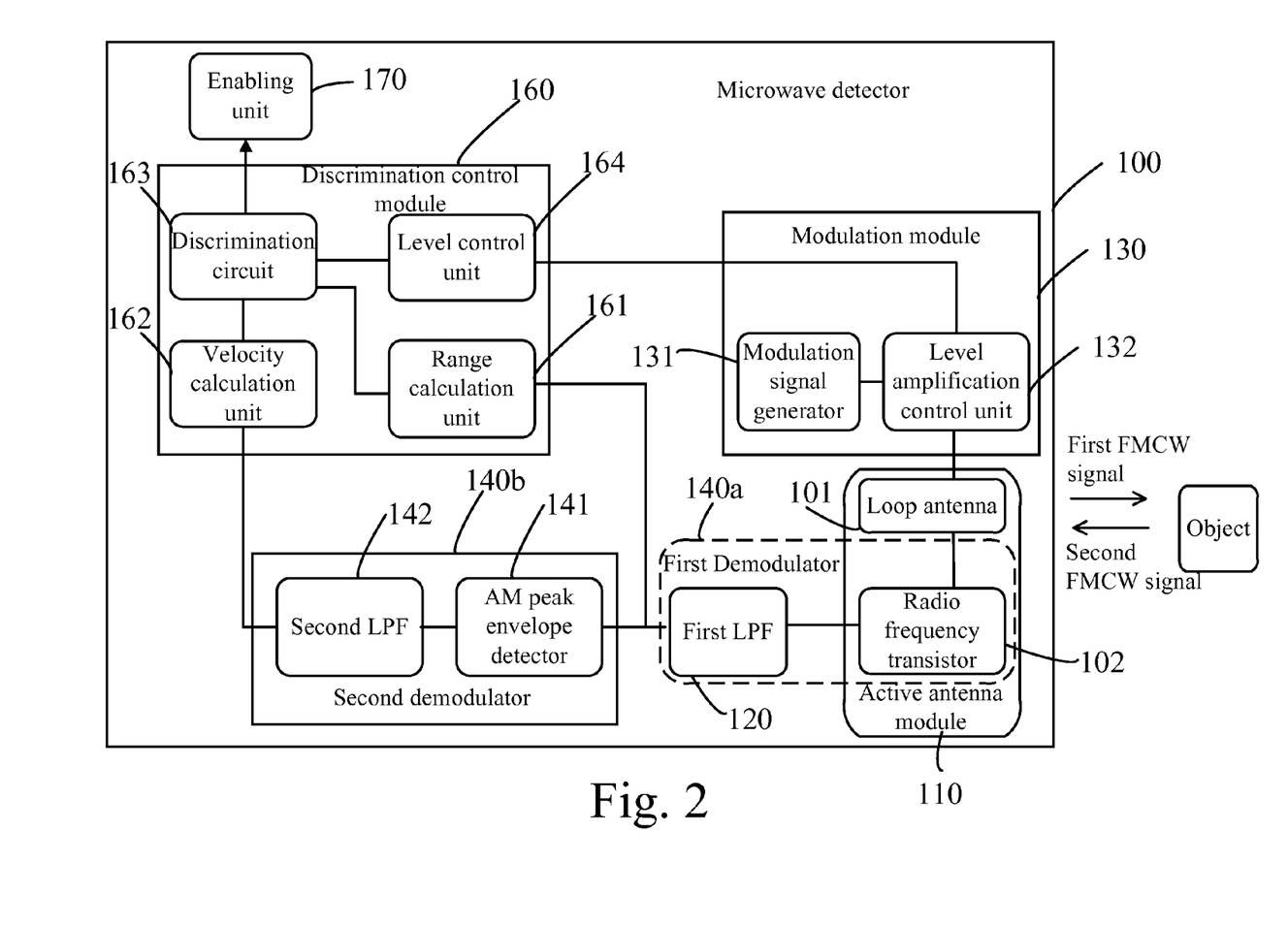
FIG. 2 is a schematic diagram showing a structure of a microwave sensor according to the present invention.

Please refer to FIG. 2, FIG. 2 is a schematic diagram showing a structure of a microwave sensor 100 according to the present invention. The microwave antenna 100 comprises an active antenna module 110, a first low pass filter 120, a modulation module 130, a second demodulator 140b, a discrimination control module 160, and an enabling unit 170. The active antenna module 110 integrates both the functions of antenna and radio frequency module. The active antenna module 110 comprises a loop antenna 101 and a radio frequency transistor 102. The loop antenna 101 transmits a first frequency modulation continuous wave (FMCW) signal towards a target and receives a second FMCW signal reflected back from the target. The first low pass filter 120 and the radio frequency transistor 102 form a first demodulator 140a. The first demodulator 140a is utilized for demodulating the first FMCW signal and the second FMCW signal to generate a beat signal based on a range gate, and the beat signal has a frequency equal to the difference between frequencies of the first FMCW signal and the second FMCW signal. The second demodulator 140b is utilized for demodulating the beat signal to generate a Doppler signal. A frequency of the Doppler signal is equal to the difference between an up-sweep beat frequency and a down-sweep beat frequency. The modulation module 130 is electrically connected to the active antenna module 110 and is utilized for generating a modulation signal to the active antenna module 110 based on one range gate selected from a plurality of range gates. A bandwidth of the first FMCW signal is adjusted according to an amplitude of the modulation signal. Each of the plurality of range gates is corresponding to one of the bandwidths of the first FMCW signal. The discrimination control module 160 is electrically connected to the modulation module 130 and is utilized for bypassing the calculation for the target if it is located outside the range gate. The discrimination control module 160 is also utilized for calculating a range between the microwave sensor 100 and the target based on the beat signal, and calculating a moving velocity of the target based on the frequency of the Doppler signal, when it is located inside the range gate, and determining whether to generate a trigger signal based on the calculated velocity and range. The enabling unit 170 then decides whether to activate another control, such as issuing an alert, flashing, etc., based on the trigger signal. The modulation module 130 is utilized for generating the modulation signal having varied amplitude based on the different detection ranges. The structure and operation of each component are elaborated in detail as follows.

Figure 3:
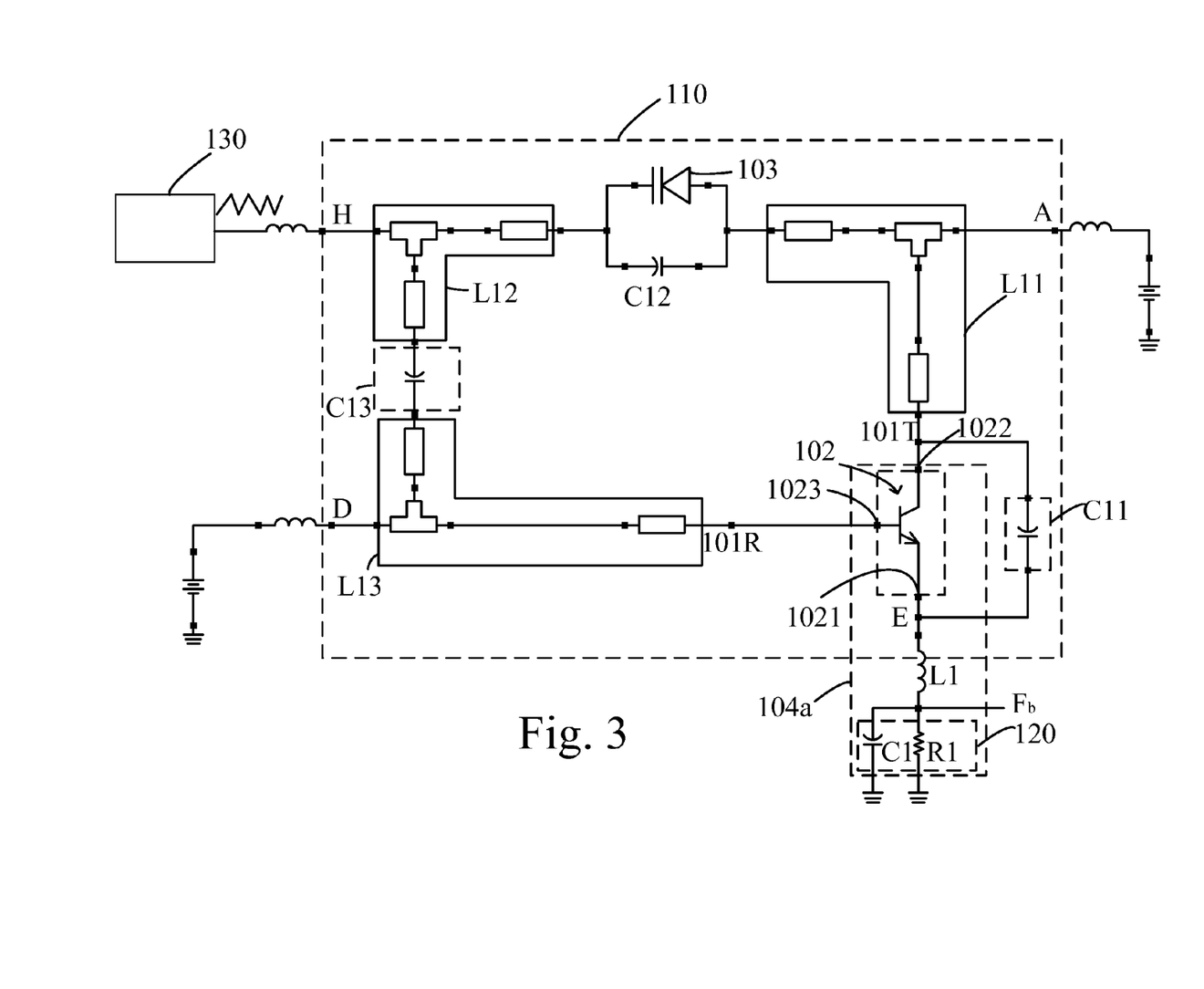
FIG. 3 is an equivalent circuit of the active antenna module in FIG. 2.

Please refer to FIG. 3, FIG. 3 is an equivalent circuit of the active antenna module in FIG. 2. The active antenna module 110, having a self-mixing and self-demodulation architecture, comprises the loop antenna 101 and the radio frequency transistor 102. The loop antenna 101 has a transmitting terminal 101T and a receiving terminal 101R. The transmitting terminal 101T is utilized for transmitting the first FMCW signal, and the receiving terminal 101R is utilized for transmitting the second FMCW signal. The loop antenna 101 comprises a first inductor L11, a second inductor L12, a third inductor L13, a first capacitor C12, a second capacitor C13, a third capacitor C13, and a varactor 103. The radio frequency transistor 102 has a control port 1023, a first port 1021, and a second port 1022. The second port 1022 is coupled to the transmitting terminal 101T, and the control port 1023 is coupled to the receiving terminal 101R. The first port 1021 and the second port 1022 are connected to two ends of the first capacitor C12. The first port 1021 is electrically connected to the first low pass filter 120 and is used as the output terminal for an intermediate frequency (baseband) demodulation signal. The varactor 103 and the second capacitor C13 are connected in parallel.

It is worth noticing that, in FIG. 3, there must be a 180-degree phase difference between the transmitting terminal 101T and the receiving terminal 101R to form a positive feedback circuit so as to obtain good oscillation. In the figure, the radio frequency transistor 102 is represented by a bipolar junction transistor (BJT). Actually, the radio frequency transistor 102 may be a field effect transistor (FET). Under the circumstances of FET, the radio frequency transistor 102 may be a pseudo high electron mobility transistor (P-Hemt). When the radio frequency transistor 102 is a BJT, the control port 1023 is a base electrode. The first port 1021, namely the port for down conversion, is an emitting electrode, and the second port 1022 is a collector electrode. When the radio frequency transistor 102 is a FET, the control port 1023 is a gate electrode. The first port 1021, namely the port for down conversion, is a source electrode, and the second port 1022 is a drain electrode.

Figure 4:
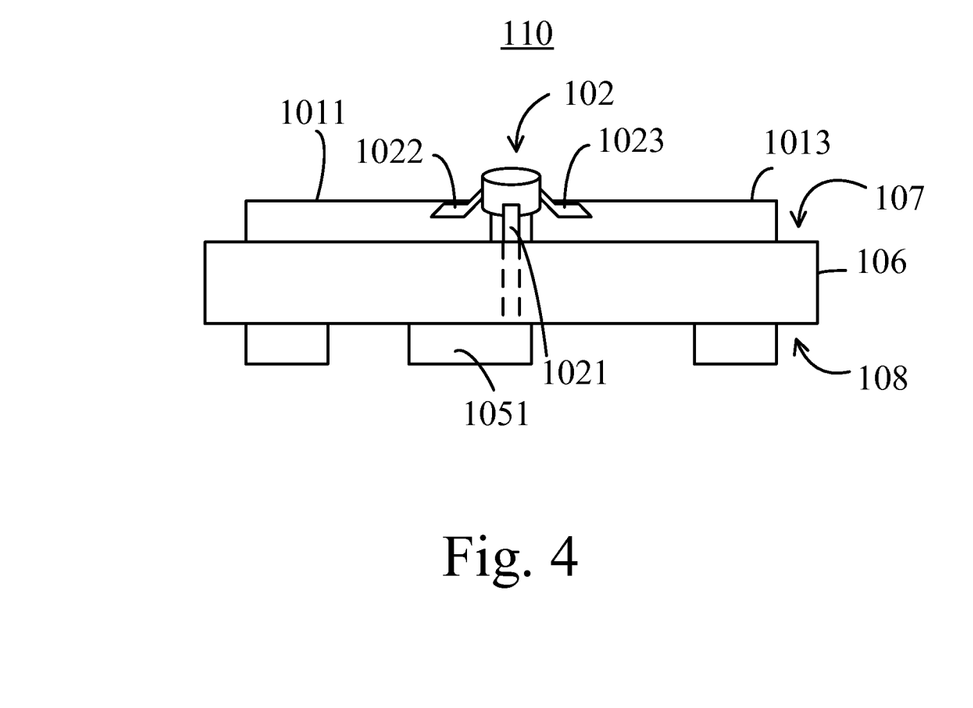
FIG. 4 is a transverse cross-sectional view of a structure of the active antenna module according to the present invention.
Figure 5:
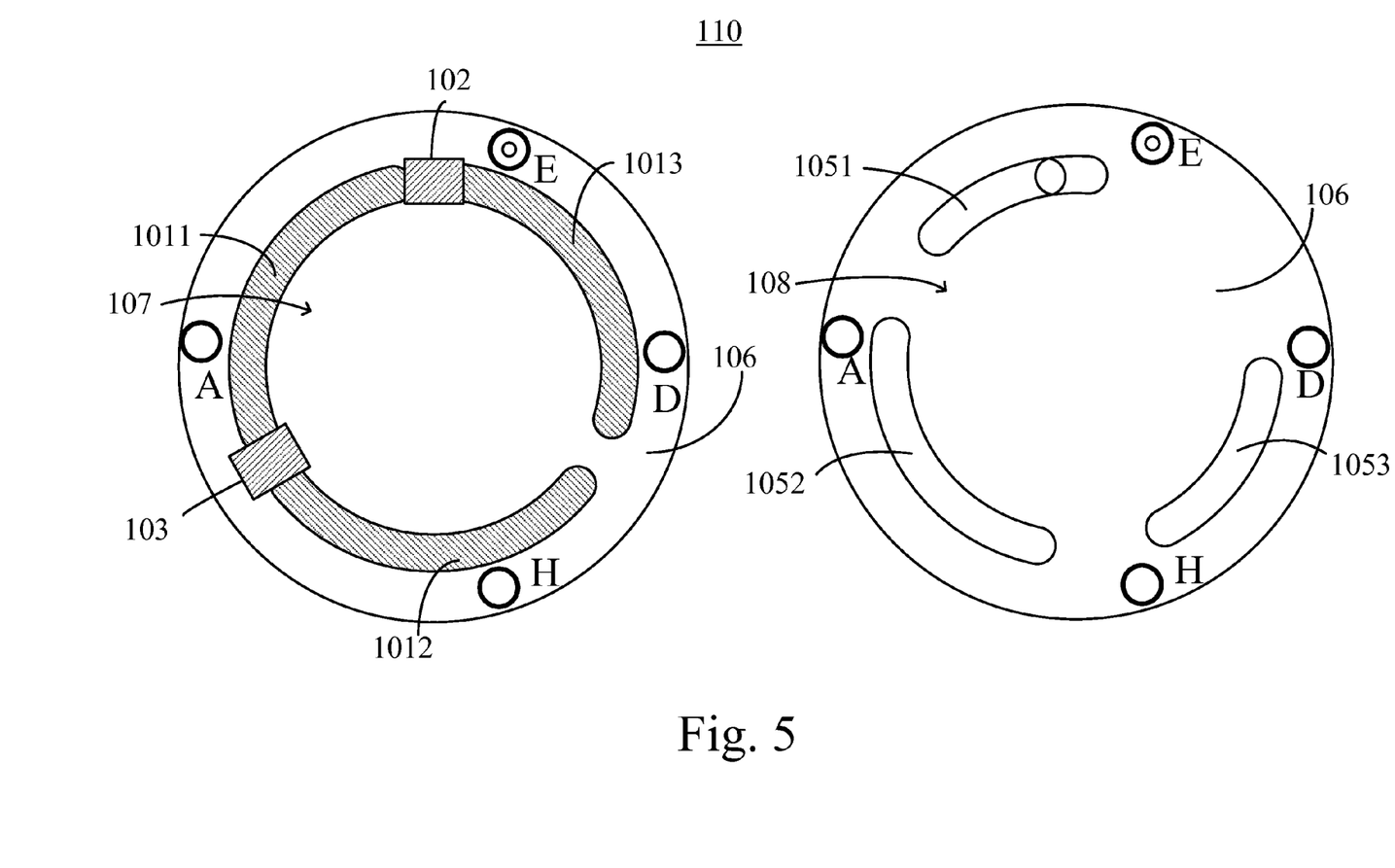
FIG. 5 shows structures on a front side and a back side of the active antenna module in FIG. 4.

Please refer to FIG. 4 and FIG. 5, FIG. 4 is a transverse cross-sectional view of a structure of the active antenna module according to the present invention. FIG. 5 shows structures on a front side and a back side of the active antenna module in FIG. 4. The active antenna module 100 comprises a first metal microstrip antenna 1011, a second metal microstrip antenna 1012, a third metal microstrip antenna 1013, a substrate 106, a radio frequency transistor 102, a first coupling metal sheet 1051, a second coupling metal sheet 1052, and a third coupling metal sheet 1053. The first metal microstrip antenna 1011, the second metal microstrip antenna 1012, and the third metal microstrip antenna 1013 are disposed on a first surface 107 (that is the front side) of the substrate 106. The first coupling metal sheet 1051, the second coupling metal sheet 1052, and the third coupling metal sheet 1053 are disposed on a second surface 108 (that is the back side) of the substrate 106. The first surface 107 and the second surface 108 are opposite faces of the substrate 106. The first metal microstrip antenna 1011, the second metal microstrip antenna 1012, the third metal microstrip antenna 1013, the substrate 106, the first coupling metal sheet 1051, the second coupling metal sheet 1052, and the third coupling metal sheet 1053 constitute the loop antenna 101 shown in FIG. 2. The first metal microstrip antenna 1011, the second metal microstrip antenna 1012, the third metal microstrip antenna 1013, the first coupling metal sheet 1051, the second coupling metal sheet 1052, and the third coupling metal sheet 1053 may be made of copper foils. The first port 1021, the second port 1022, and the control port 1023 of the radio frequency transistor 102 are respectively connected to the first coupling metal sheet 1051, the first metal microstrip antenna 1011, and the third metal microstrip antenna 1013. The first port 1021 is a port for down conversion that is used as the output terminal for the intermediate frequency (baseband) demodulation signal. Through hole A, through hole H, through hole D, and through hole E all penetrate through the substrate 106, and conducting paths are formed by adhering copper foils on the through holes. The through hole A is connected to the first metal microstrip antenna 1011 and is an input terminal of an antenna power signal. That means, the antenna power signal is input from the first metal microstrip antenna 1011 (equivalent to the first inductor L11 shown in FIG. 3). The through hole H is connected to the second metal microstrip antenna 1012 and is an input terminal for the modulation signal. That means, the through hole H is coupled to the modulation module 130 so that the modulation signal is input from the second metal microstrip antenna 1012 (equivalent to the second inductor L12 shown in FIG. 3), and the modulation signal is a triangular wave or a sine wave. The through hole D is connected to the third metal microstrip antenna 1013 and is an input terminal for a bias voltage for the radio frequency transistor 102. When the radio frequency transistor 102 is a FET, the through hole D may be connected to a fixed voltage (may be a ground terminal). The through hole E is connected to the first coupling metal sheet 1051.

The active antenna module 100 further comprises the varactor 103 disposed on the first surface 107. Two ends of the varactor 103 are connected to the first metal microstrip antenna 1011 and the second metal microstrip antenna 1012. The capacitance value of the varactor 103 will change in accordance with the voltage applied across the two ends. The varactor 103 is used for tuning a FM signal when the active antenna module 100 is applied to the FM tuner or the FM modulation circuit.

Figure 6:
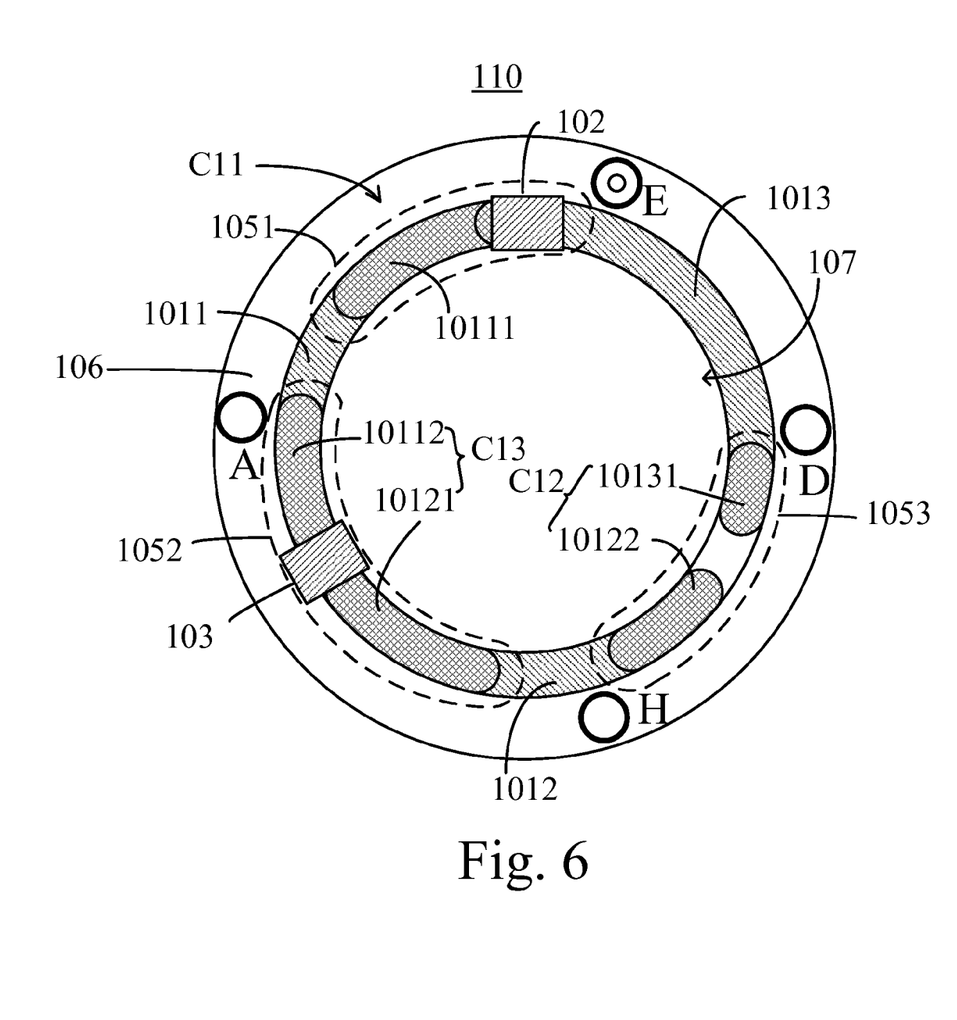
FIG. 6 is a front view of the structure of the active antenna module in FIG. 4.

Please refer to FIG. 6, FIG. 6 is a front view of the structure of the active antenna module in FIG. 4. A first portion 10111 of the first metal microstrip antenna 1011 overlaps the first coupling metal sheet 1051 to form the first capacitor C12. A second portion 10112 of the first metal microstrip antenna 1011 and a first portion 10121 of the second metal microstrip antenna 1012 adjacent to the second portion 10112 of the first metal microstrip antenna 1011 overlap the second coupling metal sheet 1052 to form the third capacitor C13. The first metal microstrip antenna 1011 is approximately in an arc shape, and the first portion 10111 and the second portion 10112 are located at both ends of the arcuate structure. A second portion 10122 of the second metal microstrip antenna 1012 and a first portion 10131 of the third metal microstrip antenna 1013 adjacent to the second portion 10122 of the second metal microstrip antenna 1012 overlap the third coupling metal sheet 1053 to form the second capacitor C13. The second metal microstrip antenna 1012 is approximately in an arc shape, and the first portion 10121 and the second portion 10122 are located at both ends of the arcuate structure. The radio frequency transistor 102 is disposed on the first surface 107. The control port 1023 of the radio frequency transistor 102 is connected to the third metal microstrip antenna 1013.

When designing, the present invention loop antenna 101 must be analyzed through experimental verification. In other words, the present invention active antenna module 110 is transformed into the dual-port circuit shown in FIG. 2. Please also refer to FIG. 6, the circumference of the planar loop antenna 101 is approximately one half of the radio frequency wavelength ($\lambda/2=2\pi r$). Since the diameter measured from the outer margin of the first metal microstrip antenna 1011, the second metal microstrip antenna 1012, and the third metal microstrip antenna 1013 on the front side is 17.1 mm, the frequency should be higher than 2.79 GHz. However, as shown by the structure in FIG. 6, the copper foils on the back side really form equivalent metal coupling capacitors. Hence, the equivalent length of the LC tank is greater than the circumference, which is 17.1π (mm), to allow the antenna frequency to be reduced to below 2.79 GHz. Furthermore, the phase of the radio frequency transistor 102 is controlled. When the variously electrical phase delays inherently existing between the drain electrode and the gate electrode or the collector electrode and the base electrode of the radio frequency transistor 102 combine with the phase delay of the antenna at its operating frequency to make up the phase delay required by a positive feedback (180°), the optimized oscillation condition is achieved. Thus, as indicated by the experimental test result, the oscillation frequency is 2.3-2.4 GHz when AT41486 transistor is utilized as the oscillator. The oscillation frequency is 2.0-2.1 GHz when BFR92 transistor is utilized as the oscillator. The combinations of metal coupling capacitors and various transistors would therefore reduce the oscillation frequency of the antenna having its original size from 2.79 GHz to 2.0-2.1 GHz. As a result, the antenna size is shrunk to miniaturize the antenna.

It is worth noticing that the stability of the loop antenna 101 will be affected when adjusting the metal coupling capacitors. Take the BJT utilized as the radio frequency transistor 102 as an example, the lower the capacitance value of the equivalent metal coupling capacitor that is used as the first capacitor C11 is, the lower the internal impedance of the radio frequency transistor 102 is to increase the base current $I_B$, based on simple small-signal model equation of BJT. The increased base current $I_B$ will cause the collector current $I_C$ increase. Hence, the spectrum stability of the loop antenna 101 caused by radio frequency oscillation is improved. Furthermore, in the design shown in FIG. 2, the magnitude of the current must be considered when designing the oscillating sensor to ensure good operation. That means, the base current $I_B$, the emitting current $I_E$, and the collector current $I_C$ must be considered when the radio frequency transistor 102 is a BJT. But when the radio frequency transistor 102 is a FET, the gate voltage $V_G$, the source current $I_S$, and the drain current $I_D$ must be considered. For example, special attention should be paid to the design because the emitting current $I_E$ decides the radiation signal strength and consequently affects the sensing range directly. It is understandable that the operating point of the oscillator may be decided by the bias voltage. Theoretical value is very easy to find, but the optimized point must be obtained by experimental verification. The optimized point is found from the conditions having a signal to noise (S/N) ratio higher than the required S/N ratio.

In this structure, the desired equivalent inductance value and the desired equivalent capacitance value are achieved by selecting the first microstrip antenna metal sheet 1011, the second microstrip antenna metal sheet 1012, the third microstrip antenna metal sheet 1013, the first coupling metal sheet 1051, the second coupling metal sheet 1052, and the third coupling metal sheet 1053. As mentioned previously, by designing the lengths of the metal coupling capacitors, the operating frequency of the loop antenna 101 is adjusted toward the lower frequency. In other words, the equivalent length for the half wavelength ($\lambda g/2$) is elongated. In addition, the operating point of the radio frequency transistor 102 is adjusted to compensate the inadequate phase. Finally, the first microstrip antenna metal sheet 1011, the second microstrip antenna metal sheet 1012, the third microstrip antenna metal sheet 1013, the first coupling metal sheet 1051, the second coupling metal sheet 1052, and the third coupling metal sheet 1053 are designed in a manner so that they are used as the resonator when the radio frequency transistor 102 resonates.

Please refer to FIG. 2 and FIG. 3 again, the operating frequency of the present invention loop antenna 101 is decided by the inductance value L of the loop antenna 101 (relevant to the lengths of the first microstrip antenna metal sheet 1011, the second microstrip antenna metal sheet 1012, and the third microstrip antenna metal sheet 1013) and the capacitance value C contributed by the first capacitor C11, the second capacitor C12, and the third capacitor C13 (relevant to the lengths of the first capacitor C11, the second capacitor C12, and the third capacitor C13). The larger the LC value is, the lower the radio frequency oscillation frequency is. Conversely, the smaller the LC value is, the higher the radio frequency oscillation frequency is. However, it is worth noticing that the radio frequency stability is closely related to the selection of the coupling capacitor and the bypass capacitor. When the radio frequency transistor 102 is a BJT, according to the simple small-signal model equation $I_C=\beta I_B$, the smaller the capacitance value of the first capacitor C11, the lower the internal impedance of the radio frequency transistor 102 is to cause the β value increase. That means, the collector current $I_C$ is increased to improve the radio frequency stability of the loop antenna 101. When the radio frequency transistor 102 is a FET, the simple small-signal model equation of FET is as follows:

$$I_D = I_{DSS}\left(1 - \frac{V_{GS}}{V_P}\right)^2,$$

where $V_P$ is the pinch-off voltage, $V_{GS}$ is the gate-source voltage, $I_{DSS}$ is the drain-source saturation current. The smaller the capacitance value of the first capacitor C11 is, the lower the internal impedance $r_{DS}$ of the radio frequency transistor 102 is. Since $V_{DS}=r_{DS} \times I_D$, the current $I_D$ is relatively increased under the circumstances of constant input voltage (the drain-source voltage $V_{DS}$ is a constant value).

In summary, in this circuit design, the lower the capacitance values of the first capacitors C11 is, the more stable the radio frequency oscillation is. That is, on the frequency spectrum distribution, the harmonic energy is decreased but the domain energy is increased. Conversely, the higher the capacitance values of the first capacitors C11 is, the less stable the radio frequency oscillation is. That is, on the frequency spectrum distribution, the harmonic energy is increased but the domain energy is decreased. As for the coupling capacitors C12, C13, their effects are just opposite to that of the first capacitor C11. The higher the capacitance values of the coupling capacitors C12, C13 are, the more stable the system is. That is, on the frequency spectrum distribution, the harmonic energy is decreased but the domain energy is increased. Conversely, the lower the capacitance values of the coupling capacitors C12, C13 are, the less stable the system is. That is, on the frequency spectrum distribution, the harmonic energy is increased but the domain energy is decreased.

When the structure of the equivalent model shown in FIG. 3 is compared with a standard radar structure, metal (or copper foil) on the front side and metal (or copper foil) on the back side are equivalent to the loop antenna structure if it is equivalent to a standard radar antenna. In addition, when it is used as a voltage controlled oscillator, the loop antenna and the metal stripes are respectively equivalent to the equivalent inductor (L) and the equivalent capacitor (C), and together constitute the resonant cavity of the transistor. In the present invention active antenna module 100, the radio frequency transistor 102 also has the functions of the voltage controlled oscillator and the mixer. The first microstrip antenna metal sheet 1011, the second microstrip antenna metal sheet 1012, the third microstrip antenna metal sheet 1013, the first coupling metal sheet 1051, the second coupling metal sheet 1052, and the third coupling metal sheet 1053 are designed in a manner so that they are used as the resonator when the radio frequency transistor 102 resonates. When it is used as the mixer, the bias voltage applied to the base is utilized for driving the radio frequency transistor 102 to operate near the saturation region so as to detect the intermediate frequency signal at the emitter.

Please refer to FIG. 3, since the radio frequency transistor 102 of the active antenna module 110 functions as the mixer, the radio frequency transistor 102 and the first low pass filter 120 may act as the first demodulator 140a to down convert and demodulate the first FMCW signal and the second FMCW signal for the first time so as to obtain the beat signal. That means, when the second port 1022 of the radio frequency transistor 102 serves as the transmitting terminal 101T for the first FMCW signal (with a frequency $f_t$) and the control port 1023 serves as the receiving terminal 101R for the second FMCW signal (with a frequency $f_r$) reflected back from the target, the first port 1021 outputs the beat signal. The frequency of the beat signal $f_b(=f_t-f_r)$ can be utilized for calculating and obtaining the range between the microwave sensor 100 and the target. The method is elaborated in detail as follows.

Figure 7:
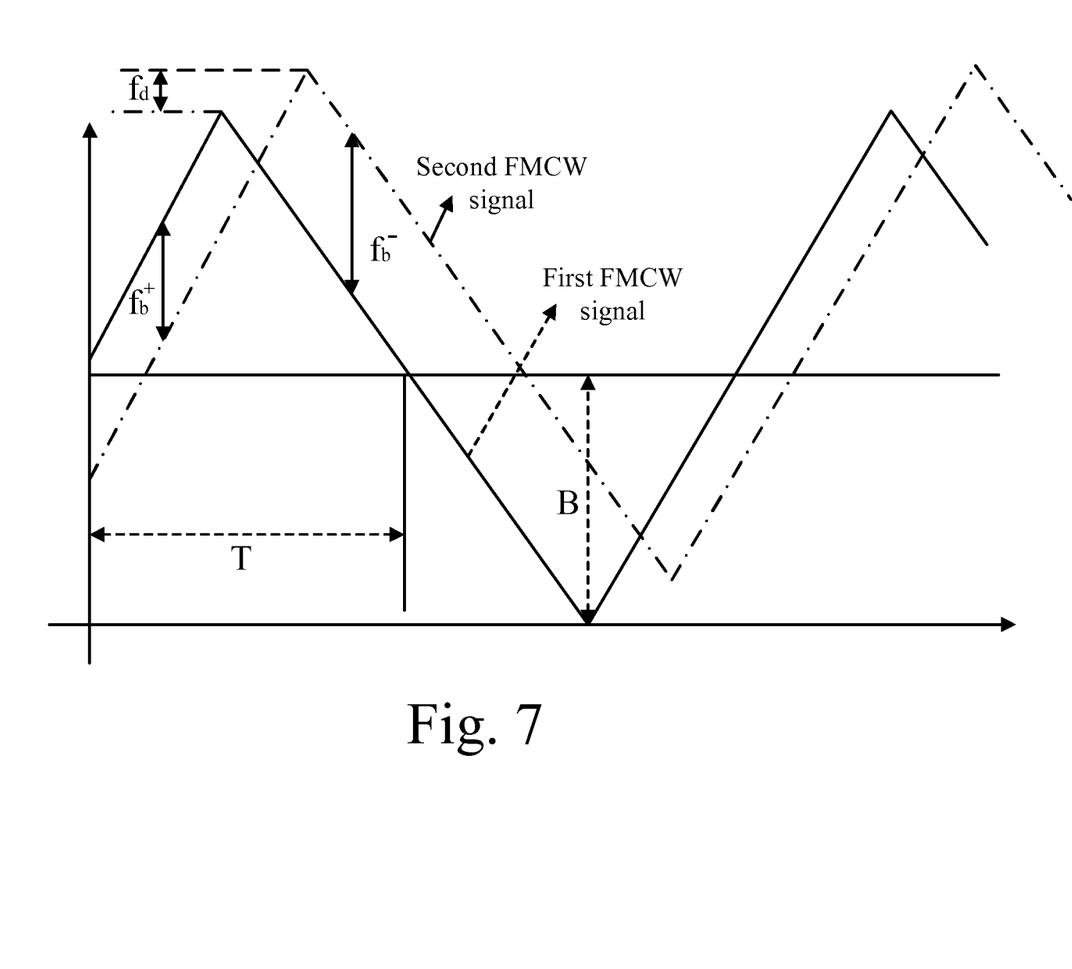
FIG. 7 is a plot of the frequency of the first FMCW signal transmitted from the microwave sensor and the frequency of the second FMCW signal received by the microwave sensor versus time according to the present invention.

Please refer to FIG. 7, FIG. 7 is a plot of the frequency of the first FMCW signal transmitted from the microwave sensor 100 and the frequency of the second FMCW signal received by the microwave sensor 100 versus time according to the present invention. The up-sweep beat frequency $f_b^+$ and the down-sweep beat frequency $f_b^-$ represent the differences between the frequencies of the first FMCW signal and the second FMCW signal when sweeping upward and downward, respectively. When there is no relative movement between the target and the microwave sensor 100, $f_b=f_b^+=f_b^-$. When the target moves towards the microwave sensor 100, $f_b^+=f_b-f_d$, $f_b^-=f_b+f_d$, and $f_d$ represents the frequency of the Doppler signal. When the target moves away from the microwave sensor 100, $f_b^-=f_b-f_d$, $f_b^+=f_b+f_d$. Hence, $f_b=(f_b^-+f_b^+)/2$.

Figure 8:
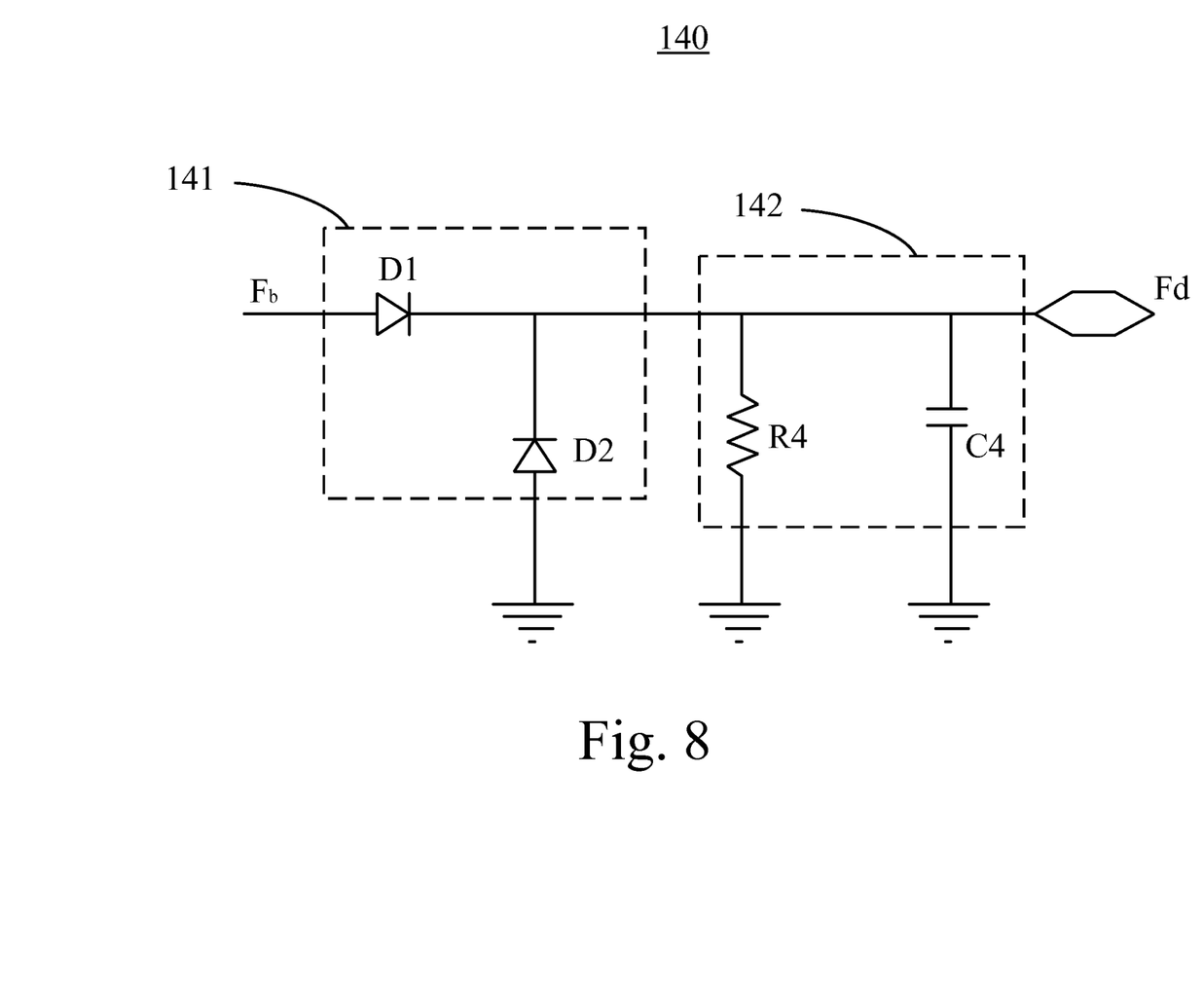
FIG. 8 is a circuit diagram of the second demodulator.

Please refer to FIG. 8, FIG. 8 is a circuit diagram of the second demodulator 140b. The second demodulator 140b comprises an AM peak envelope detector 141 and a second low pass filter 142. The AM peak envelope detector 141, being electrically connected to the first port 121 of the radio frequency transistor 102, comprises diodes D1 and D2. A positive terminal of the diode D1 is coupled to the first port 121 of the radio frequency transistor 102. A negative terminal of the diode D1 is coupled to the second low pass filter 142. A positive terminal of the diode D2 is coupled to the ground terminal. A negative terminal of the diode D2 is coupled to the second low pass filter 142. The AM peak envelope detector 141 is utilized for extracting two signals having frequencies of $f_b^-+f_b^+$ and $f_b^--f_b^+$ from the beat signal $f_b$ according to the AM peak envelope detection. The Doppler signal is then obtained by utilizing the second low pass filter 142, and the Doppler signal has the frequency of $f_d=|f_b^--f_b^+|$.

The discrimination control module 160 comprises a range calculation unit 161, a velocity calculation unit 162, a discrimination circuit 163, and a level control unit 164. The range calculation unit 161 is utilized for calculating the range between the microwave sensor 100 and the target based on the beat signal $f_b$. The level control unit 164 is utilized for adjusting the sweep bandwidth B of the first FMCW signal. The discrimination circuit 163 is utilized for determining whether to transmit the trigger signal to the enabling unit 170 based on an intensity of the second FMCW signal and the moving velocity of the target. When the intensity of the second FMCW signal reflected back from the target is below a predetermined intensity, the discrimination circuit 163 will ignore the calculation results of the target. When the intensity of the second FMCW signal reflected back from the target is higher than default intensity, the discrimination circuit 163 will generate the trigger signal based on the moving velocity of the target.

The sweep bandwidth B (that is the bandwidth of the first FMCW signal) and the sweep period T are known, and they are in direct proportion to each other. As a result, the round trip time Δt which is the time difference between the first FMCW signal transmitted from the active antenna module 110 and the second FMCW signal reflected by the target and received by the active antenna module 110 can be represented by the following equation (1):

$$\Delta t = f_b \times T/B \quad (1)$$

where $f_b$ is the frequency of the beat signal, B is the sweep bandwidth, and T is the sweep period.

Since the FMCW signal is electromagnetic wave and it travels twice the range R within the round trip time Δt, therefore 2R=c×Δt (c is light velocity). The round trip time Δt of the FMCW signal is then substituted into the equation to obtain the range R represented by the following equation (2):

$$R = (f_b \times c \times T)/(2 \times B) \quad (2)$$

The velocity calculation unit 162 is utilized for calculating the moving speed v of the target based on the Doppler signal. Since the frequency of the Doppler signal $f_d = f_b^- - f_b^+ = (2 \times f_c \times v \times \cos \theta)/c$ and $f_c$ is the center frequency of the carrier, the moving velocity of the target $v = (f_b^- - f_b^+) \times c/(2 \times f_c \times \cos \theta)$.

Figure 9:
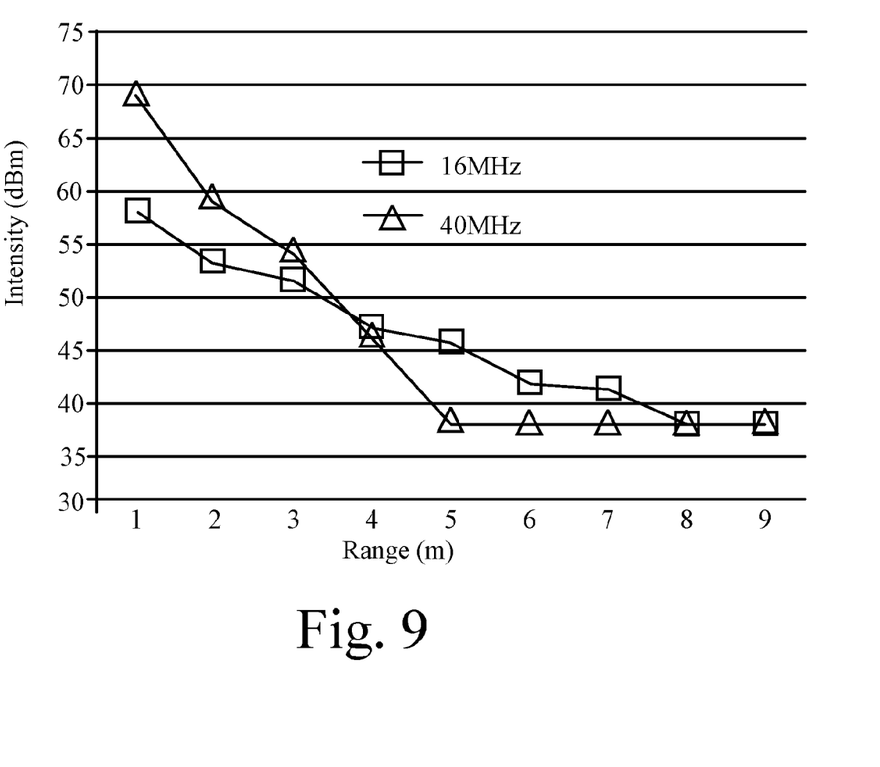
FIG. 9 is a plot of the sweep bandwidth versus range.

Please refer to FIG. 9, FIG. 9 is a plot of the sweep bandwidth versus range. In FIG. 9, the operation voltage is 12V, the first FMCW signals having sweep bandwidths of 16 MHz and 40 MHz were transmitted towards the targets having different ranges. It is observed that under the circumstances of 40 MHz sweep bandwidth, all of the energy is concentrated within four meters and attenuates suddenly after four meters, whereas under the circumstances of 16 MHz sweep bandwidth, the energy is more evenly distributed within seven meters. Hence, the larger the sweep bandwidth B (equal to the radio frequency bandwidth of the first FMCW signal Δf) is, the shorter the detection range of the microwave sensor 100 is. Conversely, the smaller the sweep bandwidth B is, the longer the detection range of the microwave sensor 100 is.

Please refer to FIG. 2, FIG. 7, and FIG. 9, the modulation module 130 comprises a modulation signal generator 131 and a level amplification control unit 132. The modulation signal generator 131 is utilized for generating the modulation signal. More preferably, the modulation signal is a triangular wave. The level amplification control unit 132 is utilized for controlling the level of the modulation signal based on a level-adjusting signal generated by the level control unit 164. The radio frequency bandwidth of the first FMCW signal Δf will be directly affected by the amplitude of the modulation signal generated by the modulation signal generator 131. The larger the amplitude of the modulation signal is, the larger the radio frequency bandwidth Δf is. Conversely, the smaller the amplitude of the modulation signal is, the smaller the radio frequency bandwidth Δf is. As a result, the radio frequency bandwidth of the first FMCW signal Δf is reduced when the detection range is enlarged. Conversely, the radio frequency bandwidth of the first FMCW signal Δf is enlarged when the detection range is reduced.

According to the embodiment of the present invention, the microwave sensor 100 sets a plurality of stages of range gates (i.e. detection ranges). Each of the stages of the range gate is corresponding to one of the frequency bandwidths Δf of a FMCW signal, and each of the frequency bandwidths Δf of the FMCW signal is corresponding to one of the amplitudes of the modulation signal. If the range gate of the microwave sensor 100 is set as 4 meter, the modulation signal generator 131 will generate the corresponding triangular signal, which is the first FMCW signals having the bandwidth of 40 MHz. The energy of the second FMCW signal reflected back from the target having its range more than four meters is substantially attenuated when compared with that reflected back from the target having its range less than four meters. The discrimination circuit 163 of the discrimination control module 160 therefore ignores the second FMCW signal reflected back from the target having its range more than four meters. By doing so, the present invention microwave sensor 100 controls the amplitude of the modulation signal generated by the modulation signal generator 131 to set the plurality of stages of the range gates. Each of the stages of the range gates is corresponding to one detection range. Only the target within the set detection range is detected. Hence, the present invention sets each of the detection ranges expressly.

Figure 10:
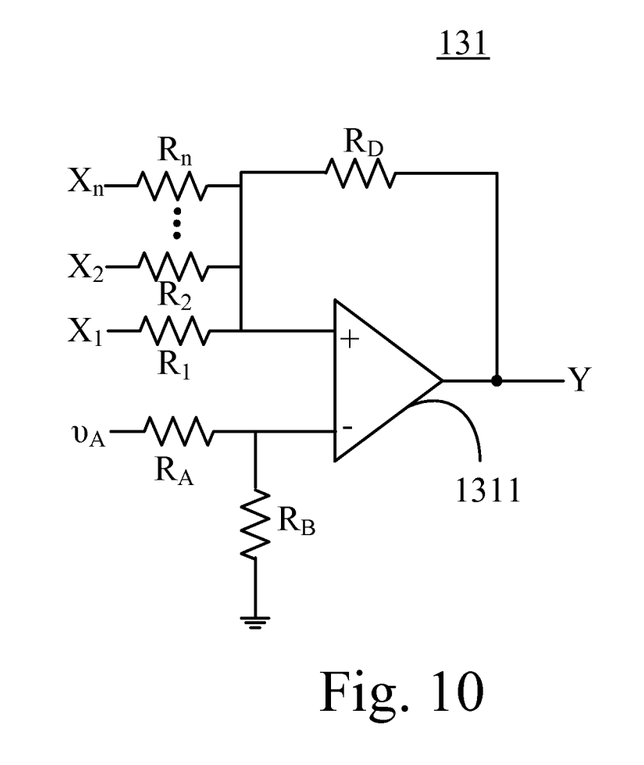
FIG. 10 is a circuit diagram of the modulation signal generator in FIG. 2 according to an embodiment of the present invention.

The modulation signal generator 131 may synthesize the triangular signal with the digital to analog interface of a digital signal processor, and the digital signal processor controls the magnitude of the amplitude by itself. The modulation signal generator 131 may also be the triangular wave generator of the analog circuit, as shown in FIG. 10. The modulation signal generator 131 may be an adder using an operational amplifier 1311 which comprises a plurality of input terminals $X_1, X_2, \ldots, X_n$ and an output terminal Y. Each of the resistors $R_1, R_2, \ldots, R_n$ is coupled between the corresponding input terminal in the input terminals $X_1, X_2, \ldots, X_n$ and the positive input terminal of the operational amplifier 1311. By grounding one of the input terminals $X_1, X_2, \ldots, X_n$ and floating the other input terminals, the output terminal Y will output the triangular modulation signal having varied amplitude.

In summary, the present invention microwave sensor is suitable for being applied to the miniaturized sensors which are used for detecting the moving targets at a short range but having a wide coverage angle. Since the oscillator and the mixer of the radio frequency module and the antenna are integrated together, the radio frequency transceiver is simplified and shrunken. At the same time, the voltage controlled oscillator and the mixed are replaced by a BJT or a FET (for example: P-Hemt). Not only the size but also the power consumption is improved obviously. Furthermore, according to the present invention, the first demodulator of the microwave sensor utilizes the diode in cooperation with the low pass filter to replace the mixer and performs the first stage down converting and demodulating to extract the information for calculating range. Then the second demodulator performs the second stage down converting and demodulating to extract the information for calculating velocity. Because the present invention microwave sensor directly and rapidly extracts the information for range and velocity from the hardware circuit and calculates the range and velocity, the complexity for designing digital signal processor in the traditional microwave sensor in greatly reduced. In addition, the present invention adjusts the radio frequency bandwidth of the FMCW signal by first adjusting the amplitude of the modulation signal generated by the modulation signal generator to control the various detection ranges. In the present invention, a plurality of detection ranges is set. Only the target within the preset detection range is allowed to be induced. The present invention sets each of the detection ranges expressly.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A microwave antenna, comprising:
   an active antenna module utilized for transmitting a first frequency modulation continuous wave signal towards a target and receiving a second frequency modulation continuous wave signal reflected back from the target according to a sweep period, the active antenna module comprising:

a loop antenna comprising a transmitting terminal and a receiving terminal, the transmitting terminal being utilized for transmitting the first frequency modulation continuous wave signal, and the receiving terminal being utilized for transmitting the second frequency modulation continuous wave signal; and a radio frequency transistor, the radio frequency transistor comprising a control port, a first port, and a second port, the second port being coupled to the transmitting terminal, the control port being coupled to the receiving port, and the control port and the second port being out of phase;

a first low pass filter electrically connected to the first port of the radio frequency transistor, the first low pass filter and the radio frequency transistor forming a first demodulator, the first demodulator being utilized for demodulating a beat signal based on a range gate, and the beat signal having a frequency equal to a difference between frequencies of the first frequency modulation continuous wave signal and the second frequency modulation continuous wave signal;

a second demodulator electrically connected to the first port of the radio frequency transistor, the second demodulator being utilized for demodulating the beat signal to generate a Doppler signal, a frequency of the Doppler signal being equal to a difference between an up-sweep beat frequency and a down-sweep beat frequency;

a modulation module electrically connected to the active antenna module, the modulation module being utilized for generating a modulation signal to the active antenna module based on a range gate selected from a plurality of range gates, a bandwidth of the first frequency modulation continuous wave signal being adjusted according to an amplitude of the modulation signal, and each of the plurality of range gates being corresponding to one of the bandwidths of the first frequency modulation continuous wave signal; and a discrimination control module electrically connected to the modulation module, the discrimination control module being utilized for bypassing a calculation for the target if the target being located outside the range gate, and calculating a range between the microwave sensor and the target based on the beat signal and a moving velocity of the target based on the frequency of the Doppler signal if the target being located inside the range gate.

2. The microwave sensor as claimed in claim 1, wherein the radio frequency transistor is a bipolar junction transistor, the control port is a base electrode, the first port is an emitting electrode, and the second port is a collector electrode.

3. The microwave sensor as claimed in claim 2, wherein the radio frequency transistor is a field effect transistor, the field effect transistor comprises a pseudo high electron mobility transistor, the control port is a gate electrode, the first port is a source electrode, and the second port is a drain electrode.

4. The microwave sensor as claimed in claim 1, wherein the microwave sensor further comprises a first capacitor, two ends of the first capacitor are connected to the first port and the second port of the radio frequency transistor, and the loop antenna comprises:

a first inductor coupled to the second port of the radio frequency transistor;

a second inductor;

a third inductor coupled to the control port of the radio frequency transistor;

a second capacitor coupled between the first inductor and the second inductor; and a third capacitor coupled between the second indictor and the third inductor.

5. The microwave sensor as claimed in claim 1, wherein the modulation module comprises a digital to analog interface of a digital signal processor, the modulation signal is synthesized with the digital to analog interface.

6. The microwave sensor as claimed in claim 1, wherein the modulation module comprises an adder using an operational amplifier, the operational amplifier comprises a plurality of input terminals and an output terminal, each of a plurality or resistors is coupled between the corresponding input terminal and a positive input terminal of the operational amplifier, when one of the input terminals is grounded and the other input terminals are floated, the modulation signal having varied amplitude is output.

7. The microwave sensor as claimed in claim 1, wherein the discrimination control module comprises a range calculation unit electrically connected to the first port of the radio frequency transistor, the range calculation unit is utilized for calculating the range between the microwave sensor and the target based on a first equation, the first equation is $R=(f_b \times c \times T)/(2 \times B)$, where R is the range between the microwave sensor and the target, $f_b$ is a frequency of the beat signal, B is a sweep bandwidth, c is the light velocity, T is the sweep period.

8. The microwave sensor as claimed in claim 1, wherein an angle is formed between the transmitting direction of the first frequency modulation continuous wave signal transmitted from the active antenna module and a moving direction of the target, a velocity calculation unit is utilized for calculating the velocity of the target along a moving direction based on the angle, the light velocity, and a center frequency of carrier of the first frequency modulation continuous wave signal.

9. The microwave sensor as claimed in claim 8, wherein the discrimination control module comprises the velocity calculation unit, the velocity calculation unit is utilized for calculating the velocity of the target along the moving direction based a second equation, the second equation is $v=(f_b^- - f_b^+) \times c/(2 \times f_c \times \cos\theta)$, where v is the velocity of the target along the moving direction, $f_b^-$ is a down-sweep beat frequency, $f_b^+$ is an up-sweep beat frequency, c is the light velocity, $f_c$ is the center frequency of the carrier.

10. The microwave sensor as claimed in claim 1, wherein the second demodulator comprises:

an AM peak envelope sensor electrically connected to the first low pass filter; and a second low pass filter electrically connected to the AM peak envelope detector, the second low pass filter being utilized for outputting the Doppler signal.

11. The microwave sensor as claimed in claim 1, wherein the first demodulator has a function of the range gates to regulate detection ranges for the target.

* * * * *